United States Patent [19]

Ahner et al.

[11] Patent Number: 4,614,887
[45] Date of Patent: Sep. 30, 1986

[54] DYNAMO ELECTRIC MACHINE CONSTRUCTION, PARTICULARLY FOR COMBINATION WITH A PUMP UNIT

[75] Inventors: Peter Ahner, Ludwigsburg; Helmut Härer, Remseck; Siegfried Schustek, Immenstaad, all of Fed. Rep. of Germany

[73] Assignee: Robert Bosch GmbH, Stuttgart, Fed. Rep. of Germany

[21] Appl. No.: 679,915

[22] Filed: Dec. 10, 1984

[30] Foreign Application Priority Data

Dec. 16, 1983 [DE] Fed. Rep. of Germany ....... 3345581

[51] Int. Cl.⁴ .......................................... H02K 17/00
[52] U.S. Cl. ...................................... 310/166; 310/66; 310/90; 310/216; 417/420
[58] Field of Search ................... 310/166, 91, 86, 216, 310/217, 218, 104, 211, 42, 90, 157, 254; 417/420; 29/596, 605

[56] References Cited

U.S. PATENT DOCUMENTS

| 3,438,328 | 4/1969 | Laing | 310/104 |
|---|---|---|---|
| 3,447,469 | 6/1969 | Laing | 310/166 |
| 3,581,132 | 5/1971 | Laing | 310/166 |
| 3,814,963 | 6/1974 | Laing | 310/166 |
| 4,002,936 | 1/1977 | Laing | 310/166 |
| 4,043,706 | 8/1977 | Walker | 310/104 |
| 4,051,401 | 9/1977 | Hayward | 310/166 |
| 4,352,646 | 10/1982 | Laing et al. | 417/420 |
| 4,471,253 | 9/1984 | Laing | 310/166 |

FOREIGN PATENT DOCUMENTS

1538715 9/1972 Fed. Rep. of Germany ...... 310/216

*Primary Examiner*—R. Skudy
*Attorney, Agent, or Firm*—Frishauf, Holtz, Goodman & Woodward

[57] ABSTRACT

To provide a dynamo electric machine, for combination, preferably, with a centrifugal circulating pump, having a rotor which is at least part-spherical, the stator is formed of edge-wound strip material, in which the stator part is a continuous strip of L-shape deformed strip, with notches (9') cut into the L prior to deformation, the bending edge (15) of the L changing throughout the length of the strip, uniformly, with uniform change of the spacing of the notches so that, as the strip is wound over a part-spherical form which defines an air gap between the rotor and stator, the width of the teeth between adjacent notches (9') will increase to define continuous through-slots (9) for the windings, and the bending corner (15) likewise will change from a position near the root of the notches (9') to a position within the solid portion of the second leg (18) of the L. In assembly, the solid portion or second leg forms the return yoke for the stator magnetic circuit, and is located circumferentially about the axis of rotation of the motor, forming a stepped arrangement which, at least approximately, conforms to the part-spherical air gap.

8 Claims, 2 Drawing Figures

DYNAMO ELECTRIC MACHINE CONSTRUCTION, PARTICULARLY FOR COMBINATION WITH A PUMP UNIT

The present invention relates to a dynamo electric machine, and more particularly to a combination electric motor-pump, in which the pump portion is combined with the rotor of the machine and forms an essentially part-spherical cap or cup-like structure which is surrounded by a stator, wherein the stator has an inner circumferential shape matching the outer shape of the rotor rotating therein.

BACKGROUND

It is well known to combine electric motors with pump units. In the referenced German Pat. No. 15 38 715, Laing, a combination pump-motor is described in which the air gap is part-spherical, defined by a rotor of part-spherical shape which is surrounded by a stator. The stator is made in form of a lamination assembly which is bulky since the lamination stack or package which results is comparatively large. The combined unit, thus, has a poor space factor and requires substantial material quantity.

It has also previously been proposed to construct a pump-electric motor combination in which the stator is formed of a strip of sheet metal which is edge-wound and formed with winding grooves. Adjacent windings of the edge-wound strip define frusto-conical surfaces. This arrangement has a disadvantage that edge-winding of electrical sheet steel is difficult, resulting in deformation of the sheet steel as it is being edge-wound, which can be overcome only by compressing the sheet steel package, under extremely high pressures. Even high force compression cannot totally eliminate wrinkles and the like which occur along the inner circumference of the edge-wound strip, resulting in undesired air gaps to permit escape of material at the inside of the strip between the electrical sheet steel elements of the stator structure.

THE INVENTION

It is an object to improve a dynamo electric machine, and more particularly a motor within which a stator can operate which has a part-spherical shape, so that the air gap will be part of a sphere, by providing a stator structure which is readily made, does not require substantial quantities of material, and can be easily wound.

Briefly, the stator core comprises a plurality of layers of electromagnetic sheet metal strip, arranged about said part-spherical air gap. Each metal layer is made from a strip—which may be continuous to form a continuously wound layer, the strip of each sheet metal layer being formed in L-shape, in which one of the legs, e.g. the upstanding leg of the L, is edge-wound, and the other leg of the L, then the horizontal portion, extends at essentially right angles to the first or upstanding leg of the L. A plurality of notches are formed in the strips, open towards the air gap and extending at least through the second or horizontal leg of the L. The relative position of adjacent L-shaped strips is matched to the changing diameter of the spherical air gap, as the layer progress from a position of smaller diameter to one of larger diameter, following the spherical air gap. The notches, upon assembly of the strips adjacent each other, form winding slots and define, between the notches, teeth which project from the strip. The teeth surround the part-spherical air gap and are spaced therefrom by at least the first or upstanding leg of the L, and define between the air gap and the teeth a part-spherical winding space. The stator winding is wound into the winding slots formed by the notches. The second or horizontal legs of the L-shaped strips extend essentially parallel to the longitudinal axis of the stator, staggered along the changing diameter, and form a stepped, essentially spherical outer magnetic circuit for the stator winding.

In accordance with a suitable structural embodiment the rotor is journalled at the end within the stator part-spherical region by a ball pin or ball-shaped bearing end which permits the rotor to wobble slightly and thus prevent possible locking of the rotor if the pumped material should, by chance, include contaminants or solid particles which might wedge within the pumping structure and tend to cause eccentricity of rotation of the rotor within the stator structure.

The construction has the advantage that a motor is provided which is particularly adapted to drive a pump, especially a circulating pump, which is compact, has excellent space factor, and can be constructed, overall, in a smaller space than heretofore possible. The electrical mechanical transfer efficiency is high, and the requirement for electrical sheet material low, so that re-magnetization losses are decreased. A typical motor to drive a circulating pump may, for example, have a power rating of about 50 W.

DRAWINGS

FIG. 1 is a vertical sectional view through a motor-pump combination, in which the pump portion is shown only in fragmentary representation, and any elements which are standard in such a construction have been omitted for clarity; and FIG. 2 is a pictorial view of a portion of a stator sheet winding, shown in developed form, before having been edge-wound.

DETAILED DESCRIPTION

Figure 1:
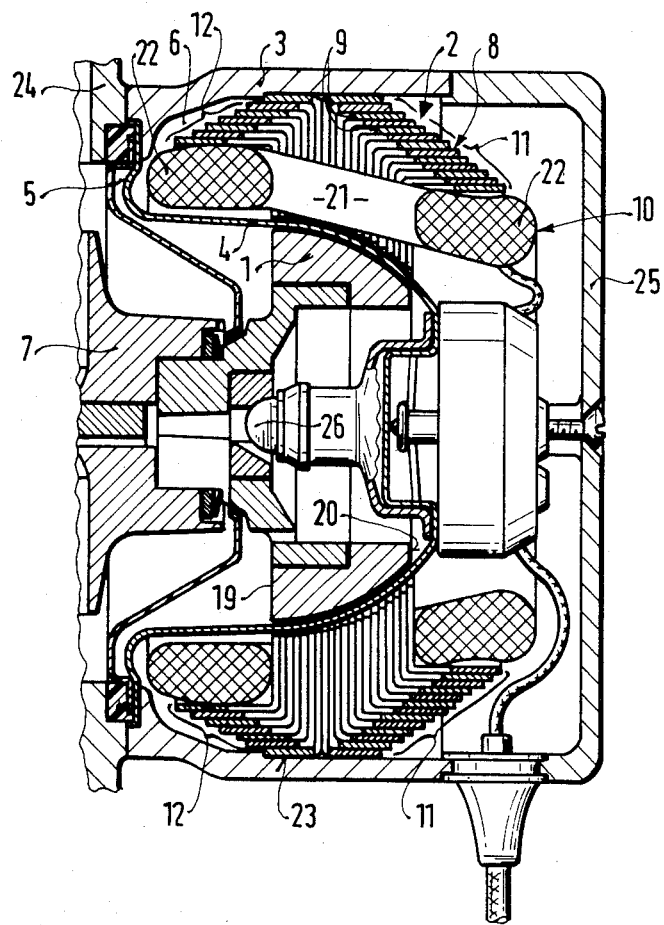

The basic construction is shown in FIG. 1, in which a part-spherical rotor 1 operates with a stator 2. The rotor 1 is rotatable about a theoretical axis passing through an axis of symmetry of the rotor. The entire pump-motor combination is secured within an essentially cylindrical housing 3. A part-spherical air gap is located between the stator 2 and the rotor 1. For electrical and fluid separation, a separating element 4, which may be a plastic, or sheet-metal of non-magnetizable material, is located in the air gap. The separating element 4, generally of cup shape, separates the inner space 5 at the rotor side from the inner space 6 of the stator side. The rotor 1 forms one single construction unit with a slinger disk or vane disk or impeller 7 of a circulating pump, not further shown, and of any suitable and standard construction.

The stator 2 is constructed in ring form and has a core package 8 formed of wound strip material. It is formed with slots 9, open towards the rotor. An operating or power winding 10 is located in the slots 9. The package 8 is formed of two portions 11, 12 which are connected together, for example by welding. Each wound strip portion 11, 12 is made of a continuous sheet-metal strip formed of soft iron, and wound in ring shape. The iron strips of the two wound portions are made by edge-winding the respective strips over a mandrel having the shape of the air gap of the stator. Before winding, notches 9' are punched out of the sheet-metal strip corresponding to the slots 9 which are to be formed. The spacing between the notches 9' is so controlled that it increases as the winding diameter increases. Teeth 13 are formed between the notches 9' the width of which increases from one end of the sheet metal strip towards the other—due to the increased spacing between the notches. The teeth 13 terminate in teeth ends 14. The depth is constant and width of all the notches 9' is approximately the same.

Figure 2:
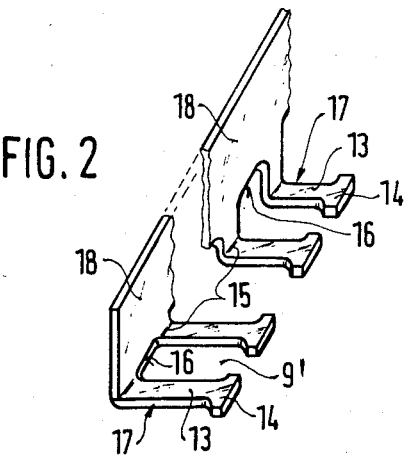

After stamping of the flat sheet-metal strip with the notches 9'—of increased spacing, to define teeth of increased width, as aforesaid, the strip is bent at right angles to form the L-shape shown in FIG. 2. The bending edge 15 will not remain at the same transverse position with respect to the previously flat strip throughout its length, but, rather, the bending edge 15 moves further towards the inner end portion or root 16 of the individual notches 9' as the width of the teeth 13 increases. The notches 9' at the beginning of the strip extend through the horizontal leg 17 of the L-shaped strip and, further, into the vertical leg 18 of the L-shaped strip. At the end of the strip, the inner end portion or root 16 of the notches 9' at least approximately coincides with the edge 15 about which the L-shaped strip is bent. The inner end portion or root 16 defines an inner wall of the notches 9'.

In manufacture, therefore, first a flat strip is stamped with the notches 9', with the spacing therebetween increasing, to define the teeth 13 of increasing width. Thereafter, the flat strip is bent, as aforesaid, about an edge 15 which travels from the position shown in the upper portion of FIG. 2 to the end portion, where the teeth 3 are wider than at the beginning, to form the bending edge essentially at the inner end portion or root 16 of the notches 9'. Thereafter, the strip is wound on a mandrel (not shown) of part-spherical shape such that the leg 7 of the L-shaped strip will fall between planes 19, 20 (FIG. 1) defining the outer end portions of the stator core in the region of the air gap within which the rotor operates. Planes 19, 20—see FIG. 1—thus define the end planes, extending transversely to the axis of rotation, of the magnetic portion of the rotor. The notched L-shaped leg 17 of the teeth 13 will begin at the planes 19, 20 and are edge-wound, so that the teeth 13, formed with enlarged end portions 14, facing the rotor 1, will form a core having the inner shape of the air gap separating element 4, whereas the teeth 13 are tightly stacked against each other and extend longitudinally to the longitudinal axis of the electric motor. The L-shaped vertical leg 18 in FIG. 2 defines the back of the strip, and will then form the horizontal portions in FIG. 1 and define the return magnetic path for the magnetic yoke structure, arranged in staggered, stepped position above each other, and extending parallel to the longitudinal axis of the motor. It should be noted, thus, that the strip shown in FIG. 2 is illustrated at right angles with respect to the illustration of FIG. 1; referring, for example, to the portion 11 of the wound strip, the teeth 13 will extend vertically towards the rotor with the leg 18 facing towards the right; with respect to the portion 12, the teeth 13 will also extend vertically, but with the leg 18 facing towards the left.

Upon winding the L-shaped strip in edge form, that is, edge-winding about the teeth 13, only small deformation of the material of the L-shaped legs will result which can easily be overcome by simple tools with readily acceptable compressive force. The portions 11 and 12 can be wound, sequentially, on a common mandrel to form adjacent, essentially concentric, spiralled winding turns; alternatively, they may be wound simultaneously on suitable mandrel portions. After winding, the two portions 11, 12 of the wound strip are assembled to form the stator core package 8, such that the winding legs 17 of the outermost windings of the leg 17 are tightly adjacent the next layer of windings; the L-shaped leg 18 of the two portions 11, 12 of the wound strip extends in opposite directions—see FIG. 1.

After assembly of the core package 8, the individual layers are secured together by welding, for example by plasma welding, which may be applied to the outer curved portion of the ring-shaped core package 8, for example by forming beads extending in circumferential direction and spaced from each other and extending from end face to end face of the stator core package 8. The welding tracks are not shown in the drawing, and their use and location will be determined in accordance with available apparatus, based on standard engineering practice.

In a suitable arrangement, the rotor is part-spherical and the first leg (17) of the L is located perpendicularly to a tangent position at half the radial extent of the maximum diameter of the rotor. If the second legs 18 extend in opposite direction, the center line of the first legs (17) of the L is located perpendicularly to a tangent which is positioned at half the radial extent of the maximum diameter of the rotor.

A winding portion 21 of the power winding 10 is located within the grooves 9 defined by the individual notches 9' of the sheet metal strip. The winding end portions 22 extend, essentially, within the region of the L-shaped legs 18 of the radially innermost portions of the portions of the wound strip 11, 12—see FIG. 1.

While it is not a requirement that the stator core package be made of two portions 11, 12, the arrangement as shown in FIG. 1 is preferred since it is particularly space-effective and compact, permitting high power output with minimum diameter of the structure. The housing 3 is formed with a seating abutment 23 so that the stator core package 8 can be assembled within the housing by interengagement of at least one of the winding parts of the L shaped stator package with a matching seat in the housing. The path length for magnetic flux has been decreased by the specific stator construction by about half with respect to prior known arrangements. Holding elements for the stator which has a part-spherical air gap to locate the particular shape of the stator with the part-spherical air gap within a housing are no longer needed due to a simple form of the abutment seat 23 within the housing structure. The deformation of material, upon edge-winding, will occur only at the inner edges of the teeth 13 and, thus, solutions which are used in accordance with the prior art in order to eliminate additional air gaps at engagement points of the sheet metal elements are no longer necessary, since the material, as it is being deformed, may escape in the zone of the individual notches 9'. This permits the teeth 13 of adjacent layers of the stator to be positioned closely against each other, and thus decreases substantially the magnetization power requirements for the stator core material.

The housing 3 of the motor is connected to the pump housing 24 of a centrifugal pump, typically a circulating pump, by suitable screw connection, and closed off at its axial end by a housing cover 25, which may be unitary with the remainder of the housing.

In the position shown in FIG. 1, which illustrates a stable operating condition, the rotor 1 is concentric with a ball end 26 of the rotor bearing. By forming the rotor bearing in ball construction, that is, with a spherical end point located in a receiving cup, see FIG. 1, the rotor 1 may wobble slightly and carry out wobbling movement about the intersecting line of the plane 19, defining the inner end of the rotor, and concentric, for example, with the center of the ball 26. This permitted deviation from precisely concentric operation within the air gap permits removal of foreign bodies from the spherical air gap which might accumulate between the rotor 1 and the air gap separating element 4, and which might, otherwise, lead to rotor blocking. The circulating pump is particularly suitable for use in residential hot-water heating installations, for supply of drinking and other water, and the like. After extended shutdown, flakes of rust, boiler scale and the like, and other contaminants may collect within the water being pumped by the impeller 7 and may become wedged between the separating gap element 4 and the rotor 1. By permitting slight wobble of the rotor, such contaminants can be readily removed from between the air gap separating element 4 and the rotor 1, for further removal in the flow of liquid pumped by the impeller 7.

The electrical portion of the motor may be in accordance with any desired and suitable and well-known motor design and construction. It is only necessary that a rotating magnetic field be generated. Thus, the electrical winding 10 may be a three-phase winding, and the rotor 1 may be made of sheet-metal disks, stacked about each other, and including a squirrel-cage rotor in which aluminum or copper short-circuit windings are cast into the magnetic sheet-metal stack. The stator 2, with the power winding, will generate a rotating magnetic field which carries along the rotor 1, thereby driving the impeller 7 of the pump.

The rotor 1, alternatively, may be wound by a continuous sheet-metal strip, forming a laminar package of layers of sheet metal, which is wound on a part-spherical outer jacket of a rotor core structure, and which has continuous grooves, into which short-circuit windings, to form a squirrel-cage rotor, can be cast. Various other types of rotor constructions can be used, for example a hysteresis-type rotor and the like. The stator permits construction as a single-phase stator with a lag coil cast or connected thereto; or the stator, for single-phase use, may be wound in two-phase capacitor-start connection; various other types of electrical connections may be used, as well known in connection with motor design.

Various changes and modifications may be made within the scope of the inventive concept.

We claim:

1. Dynamo electric machine construction particularly for combination with a circulating pump to form a combined motor-pump unit, having
   a rotor (1) shaped to define at least part of a sphere, and rotatable about a theoretical axis passing through an axis of symmetry of the at least part-spherical rotor;
   a stator (2) having a stator core (8), the stator being shaped to surround the at least part-spherical rotor and spaced therefrom by an at least part-spherical air gap;
   a separating wall (4) of non-magnetic material and of at least part-spherical shape located in the air gap separating the rotor and the stator;
   a rotor bearing (26) of at least part-spherical shape, and a matching bearing ball formed in the rotor, to permit wobbling movement of the rotor rotating within said at least part-spherical air gap,
   wherein
   the stator core comprises
   a plurality of layers formed by an elongated continuous strip of electromagnetic sheet metal circumferentially wound about and arranged about said part-spherical air gap,
   the strip of each sheet-metal layer being formed in L-shape and defining a first leg (17) and a second leg (18) of the L, the first leg extending at essentially right angle with respect to a second leg (18);
   a plurality of notches (9') formed in said strip, the first leg (17) of the L of the strip being edge-wound so that said notches (9') will be open towards the air gap and to position adjacent turns of the edge-wound leg adjacent each other;
   said notches extending at least essentially through the length of the first leg (17) of the L, and the relative position of the edges adjacent said notches being matched to the changing diameter of the spherical air gap as the layers progress from a position of smaller diameter to one of larger diameter;
   said notches (9') forming winding slots in the adjacent turns and defining, therebetween, teeth (13), the projection of said teeth surrounding the at least part-spherical air gap; and
   stator winding means (10, 21) wound in the winding slots (9) formed by the notches (9'),
   said second leg (18) of the L-shaped strip forming adjacent overlapping layers of said strip and extending essentially parallel to the longitudinal axis of the stator (2) and defining a stepped, generally at least part-spherical outer magnetic circuit.

2. Construction according to claim 1, wherein the stator comprises two stator portions (11, 12) in which the first legs (17) of the strip, extending transversely to the longitudinal axis of the stator of the respective portions are parallel and adjacent each other, and the second legs (18) of the strip, of the respective portions extend in opposite direction with respect to said parallel portions of the strip.

3. Construction according to claim 1, wherein the rotor is part-spherical and the first leg (17) of the L is located perpendicularly to a tangent positioned at half the radial extent of the maximum diameter of the rotor.

4. Construction according to claim 1, wherein the rotor is part-spherical and the center line of the first leg (17) of the L is located perpendicularly to a tangent which is positioned at half the radial extent of the maximum diameter of the rotor.

5. Construction according to claim 1, further including an essentially cylindrical housing;
   and an interengaging abutment seat formed in said housing and at least one of the second leg (18) of at least one of the layers of said strip defining the stator (2) for seating the at least one of the second legs in the housing.

6. Construction according to claim 1, wherein said strip is a continuously wound strip defining a plurality of layers, wound adjacent each other;
   and the width of the teeth defining said winding slots changes as the diameter of the stator core changes.

7. Construction according to claim 1, wherein said stator comprises two stator parts (11, 12), each one being formed by a continuously wound strip defining adjacent layers of the stator, with said second legs (18) of the respective parts facing in opposite direction.

8. Construction according to claim 1, wherein the strip in L-shape defines a bending edge (15) at the junction of the first leg of the L with the second leg of the L;

and wherein said bending edge is located at progressively different positions with respect to the first and second legs of the L, having an initial position, at a minimum distance from the axis of rotation of the rotor, which is partly within the teeth (13), and having an end position, at a maximum distance from the axis of rotation of the rotor, close to the end portions or roots of the notches (9') within the teeth.

* * * * *